(12) United States Patent
Branda et al.

(10) Patent No.: US 8,429,635 B2
(45) Date of Patent: Apr. 23, 2013

(54) CONTROLLING COMPILER OPTIMIZATIONS

(75) Inventors: Steven Joseph Branda, Rochester, MN (US); John Joseph Stecher, Rochester, MN (US)

(73) Assignee: International Buisness Machines Corporation, Armonk, NY (US)

( * ) Notice: Subject to any disclaimer, the term of this patent is extended or adjusted under 35 U.S.C. 154(b) by 847 days.

(21) Appl. No.: 12/607,198

(22) Filed: Oct. 28, 2009

(65) Prior Publication Data

US 2011/0099542 A1    Apr. 28, 2011

(51) Int. Cl.
*G06F 9/45* (2006.01)
(52) U.S. Cl.
USPC ............................ 717/154; 717/127; 717/145
(58) Field of Classification Search .................. None
See application file for complete search history.

(56) References Cited

U.S. PATENT DOCUMENTS

| 5,325,531 | A  | * | 6/1994  | McKeeman et al. | 717/145 |
| 5,854,932 | A  | * | 12/1998 | Mariani et al.  | 717/116 |
| 5,920,723 | A  | * | 7/1999  | Peyton et al.   | 717/157 |
| 2002/0066081 | A1 | * | 5/2002 | Duesterwald et al. | 717/128 |
| 2002/0095667 | A1 | * | 7/2002 | Archambault | 717/154 |
| 2006/0236310 | A1 | * | 10/2006 | Domeika et al. | 717/140 |
| 2007/0226702 | A1 | * | 9/2007 | Segger | 717/130 |
| 2009/0177874 | A1 | * | 7/2009 | Terashima | 712/234 |

* cited by examiner

*Primary Examiner* — Elias Mamo
(74) *Attorney, Agent, or Firm* — Owen J. Gamon

(57) ABSTRACT

In an embodiment, a conditional branch is detected that selects between execution of a first alternative block and a second alternative block. A first count and a second count are saved, where the first count is a number of times the first alternative block was executed, and the second count is a number of times the second alternative block was executed. If the first count is greater than a threshold and the second count equals zero, the first alternative block is compiled into first alternative block object code and the second alternative block is not compiled. If the first count is not greater than the threshold, the first alternative block is compiled into the first alternative block object code and the second alternative block is compiled into second alternative block object code.

17 Claims, 14 Drawing Sheets

| SUGGESTION 156 |||
|---|---|---|
| COMMAND ID (405) | CLASS IDS (410) | OPTIMIZATION LEVEL (415) |
| START PATH OPTIMIZATION | CLASS A, CLASS B, CLASS C, CLASS D, CLASS E, CLASS F, CLASS G | 1 |

FIG. 4

| NOTIFICATION 158 ||
|---|---|
| COMMAND ID (505) | CLASS IDS (510) |
| STOP PATH OPTIMIZATION | CLASS E |

FIG. 5

| FUNCTION DATA | | 264 |
|---|---|---|
| FUNCTION ID (606) | CLASS IDS OF CLASSES THAT PERFORM THE ASSOCIATED FUNCTION (608) | |
| TRACE | CLASS G | 602 |
| LOG | CLASS H | 604 |

FIG. 6

CONTROLLING COMPILER OPTIMIZATIONS

FIELD

An embodiment of the invention generally relates to controlling compiler optimizations.

BACKGROUND

Computer systems typically include a combination of computer hardware (such as semiconductors, circuit boards, processors, and storage devices) and computer programs. The computer programs are stored in the storage devices and are executed by the processors. Computers are often general purpose, meaning that the functions that the computer performs on the data may be altered by altering the computer programs that execute on the computer.

Human programmers often write computer programs in a form of computer language, called source code, that is relatively easy for a human to understand, but which is not efficient or possible for the processor to execute. Another program, called a compiler, then transforms or translates the source code into a form, often called object code, which is more efficient or possible for the processor in the computer to execute, but relatively difficult for a human to understand. A compiler may exist as a stand-alone compiler or may be used as part of an interpreter.

A type of compiler, called an optimizing compiler, attempts to analyze the statements or instructions within the program in order to produce object code that will execute faster or use less memory. Techniques for optimizing the object code include avoiding redundancy by reusing results that have already been computed and storing them for later use instead of re-computing them, removing unnecessary computations and intermediate values, placing code and data that are accessed closely together in time close together in memory, re-ordering instructions to allow multiple computations to happen in parallel, combining the body of loops that iterate the same number of times if they make no reference to each other's data, moving calculations that compute the same value for each iteration from inside the loop to outside the loop, and replacing expressions consisting of constants with their final value at compile-time, rather than performing the calculation at run-time, among others.

BRIEF SUMMARY

A method, computer-readable storage medium, and computer system are provided. In an embodiment, a conditional branch is detected that selects between execution of a first alternative block and a second alternative block. A first count and a second count are saved, where the first count is a number of times the first alternative block was executed, and the second count is a number of times the second alternative block was executed. If the first count is greater than a threshold and the second count equals zero, the first alternative block is compiled into first alternative block object code and the second alternative block is not compiled. If the first count is not greater than the threshold, the first alternative block is compiled into the first alternative block object code, and the second alternative block is compiled into second alternative block object code. If the second count does not equal zero, the first alternative block is compiled into first alternative block object code and the second alternative block is compiled into second alternative block object code.

BRIEF DESCRIPTION OF THE SEVERAL VIEWS OF THE DRAWINGS

Various embodiments of the present invention are hereinafter described in conjunction with the appended drawings:

FIG. 4 depicts a block diagram of an example suggestion command, according to an embodiment of the invention.

FIG. 5 depicts a block diagram of an example notification command, according to an embodiment of the invention.

FIG. 6 depicts a block diagram of an example data structure for function data, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
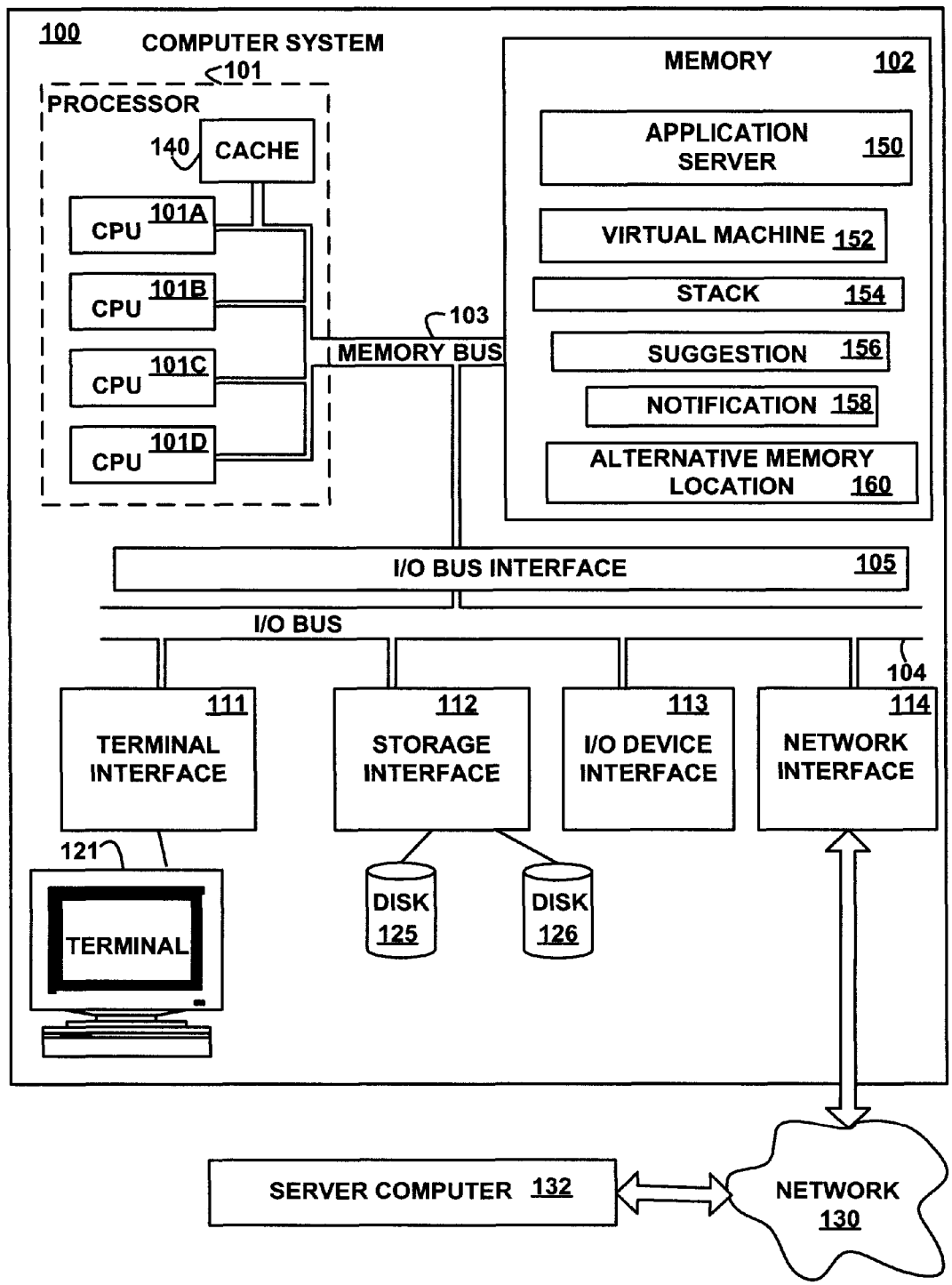
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a server computer system 132 via a network 130, according to an embodiment of the present invention. The term "server" is used herein for convenience only, and in various embodiments a computer system that operates as a client in one environment may operate as a server in another environment, and vice versa.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache 140. The cache 140 is a memory device that stores object code instructions, which the processor executes. The processor fetches the object code instructions from the memory 102 via the memory bus 103 and stores the object code instructions in the cache 140 prior to execution on the processor 101.

The main memory 102 is a random-access semiconductor memory, storage device, or storage medium for storing or encoding data and programs. In another embodiment, the main memory 102 represents the entire virtual memory of the computer system 100, and may also comprise the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an application server 150, a virtual machine 152, a stack 154, a suggestion command 156, a notification command 158, and an alternative memory location 160. Although the application server 150, the virtual machine 152, the stack 154, the suggestion command 156, the notification command 158, and the alternative memory location 160 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the application server 150, the virtual machine 152, the stack 154, the suggestion command 156, the notification command 158, and the alternative memory location 160 are illustrated as being contained within the main memory 102, these elements are not necessarily all completely contained in the same storage device at the same time. Further, although the application server 150, virtual machine 152, the stack 154, the suggestion command 156, the notification command 158, and the alternative memory location 160 are illustrated as being separate entities, in other embodiments some of them, portions of some of them, or all of them may be packaged together.

In an embodiment, one or both of the application server 150 and the virtual machine 152 comprise instructions or statements that execute on the processor 101 or instructions or statements that are interpreted by instructions or statements that execute on the processor 101, to carry out the functions as further described below with reference to FIGS. 12, 13, 14, 15, 16, and 17. In an embodiment, one or both of the application server 150 and the virtual machine 152 are implemented in hardware via semiconductor devices, chips, logical gates, circuits, circuit cards, and/or other physical hardware devices in lieu of, or in addition to, a processor-based system.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user terminals 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user terminal 121 and the computer system 100, and may receive output data via the user output devices. For example, a user interface may be presented via the user terminal 121, such as displayed on a display device, played via a speaker, or printed via a printer. In various embodiments, the display device may be implemented as a Cathode Ray Tube (CRT), a Liquid Crystal Display (LCD), or any other appropriate display technology.

The storage interface unit 112 supports the attachment of one or more direct access storage devices (DASD) 125 and 126 (which are typically rotating magnetic disk drive storage devices, although they could alternatively be other devices, including arrays of disk drives configured to appear as a single large storage device to a host). In another embodiment, the devices 125 and 126 may be implemented via any type of secondary storage device. The contents of the main memory 102, or any portion thereof, may be stored to and retrieved from the storage devices 125 and 126, as needed.

The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user "mainframe" computer system, a single-user system, or a server or similar device that has little or no direct user interface, but receives requests from other computer systems (clients). In other embodiments, the computer system 100 may be implemented as a desktop computer, portable computer, laptop or notebook computer, tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol).

In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network or cell-based radio network technology. In another embodiment, the network 130 is implemented as any suitable network or combination of networks. Although one network 130 is shown, in other embodiments any number of networks (of the same or different types) may be present.

It should be understood that FIG. 1 is intended to depict the representative major components of the computer system 100, the network 130, and the server computer system 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the computer system 100, and that, when read and executed by one or more processors in the computer system 100 or when interpreted by instructions that are executed by one or more processors, cause the computer system 100 to perform the actions necessary to execute steps or elements comprising the various aspects of embodiments of the invention.

As will be appreciated by one skilled in the art, aspects of embodiments of the present invention may be embodied as a system, method, or computer program product. Accordingly, aspects of embodiments of the present invention may take the form of an entirely hardware embodiment, an entirely program embodiment (including firmware, resident programs, micro-code, etc that are stored in a storage device) or an embodiment combining program and hardware aspects that may all generally be referred to herein as a "circuit," "module," or system." Furthermore, embodiments of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the disks 125 or 126), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device.

Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems) and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified the flowchart and/or block diagram block or blocks. The computer programs defining the functions of various embodiments of the invention may be delivered to a computer system via a variety of tangible computer-readable storage media that may be operatively or communicatively connected (directly or indirectly) to the processor or processors.

The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, and integrating the computer-readable code into existing processes, computer systems, and computing infrastructure.

In various embodiments, integrating the computer-readable code may comprise loading computer-readable code onto a computer via a computer-readable storage medium, automatically deploying computer-readable code into a computer system by sending the computer-readable code to a server computer system and downloading and storing the computer-readable code into a storage medium at client computer systems that execute the computer-readable code, deploying the computer-readable code to client computer systems via sending the computer-readable code to the client computer systems via email or encoded in an email attachment, which load the computer-readable code into a directory and execute the computer-readable code. In various embodiments, integrating the computer-readable code may comprise selecting the computer-readable code from among different types and functions of code, determining on which computers to load the computer-readable code, transmitting the computer readable code, and installing the computer-readable code onto storage media at the selected computers, which execute the selected computer-readable code. Aspects of a service embodiment of the present invention further comprise metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit embodiments of the invention. Indeed, other alternative hardware and/or programming environments may be used without departing from the scope of embodiments of the invention.

Figure 2:
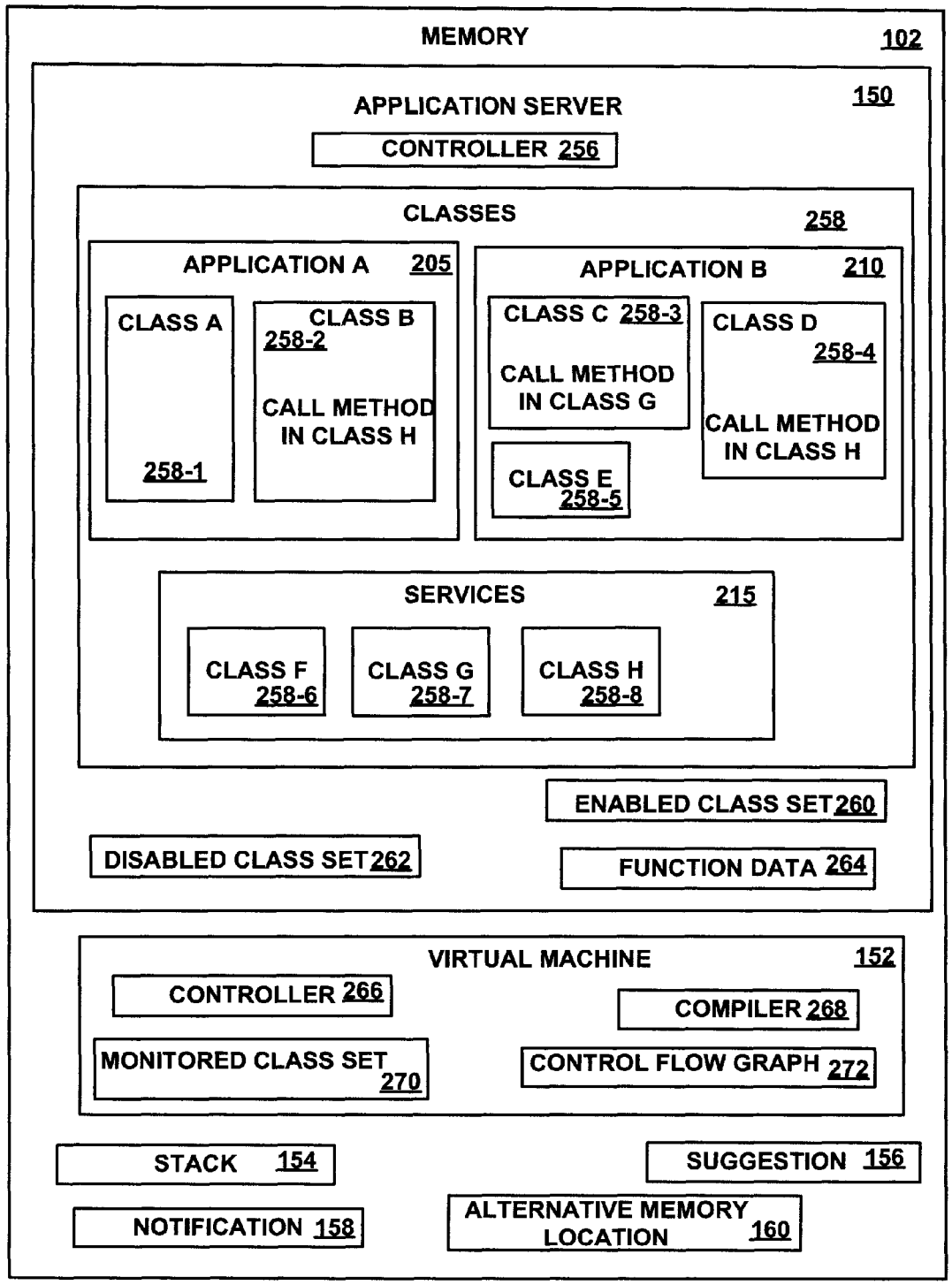
FIG. 2 depicts a block diagram illustrating further detail of the contents of memory, according to an embodiment of the invention.

FIG. 2 depicts a block diagram illustrating further detail of the contents of the memory 102, according to an embodiment of the invention. The main memory 102 stores or encodes an application server 150, a virtual machine 152, a stack 154, a suggestion command 156, a notification command 158, and an alternative memory location 160.

The application server 150 comprises a controller 256, classes 258, an enabled class set 260, a disabled class set 262, and function data 264. The controller 256 comprises instructions or statements that execute on the processor 101 or instructions or statements that are interpreted by instructions or statements that execute on the processor 101, to carry out the functions as further described below with reference to FIGS. 12, 13, 14, 15, 16, and 17. In an embodiment, the controller 256 is implemented in hardware via semiconductor devices, chips, logical gates, circuits, circuit cards, and/or other physical hardware devices in lieu of, or in addition to, a processor-based system.

The classes 258 represent source code that, after being compiled by the compiler 268, execute on the processor 101. The classes 258 comprise example application classes 205, example application classes 210, and example service classes 215. The application classes 205 comprise example classes 258-1 and 258-2. The example class 258-2 comprises a statement or instruction that, after being compiled into object code, is executed by the processor 101 and calls or invokes a method in the services classes 215. The application classes 210 comprise example classes 258-3, 258-4, and 258-5. The example class 258-3 comprises a statement or instruction that, after being compiled into object code by the compiler 268, is executed by the processor 101 and calls or invokes a method in the services classes 215. The example class 258-4 comprises a statement or instruction that, after being compiled into object code by the compiler 268, is executed by the processor 101 and calls or invokes a method in the services classes 215.

The services classes 215 comprises example classes 258-6, 258-7, and 258-8. The enabled class set 260 comprises identifiers of classes that are to be added to the monitored class set 270. The disabled class set 262 comprises identifiers of classes that are to be removed from the monitored class set 270. The function data 264 is further described below with reference to FIG. 6. The virtual machine 152 comprises a controller 266, a compiler 268, a monitored class set 270, and a control flow graph 272.

In an embodiment, the classes 258 are organized into containers. Examples of containers include a servlet/JSP (JAVA Service Page) container, an EJB (Enterprise JAVA Beans) container, and a WebServices container. The controller 256 knows which containers that the applications 205 and 210 use to provide the functionality of the applications and knows which of the classes 258 are included in, or are a part of, those containers.

The controller 266 comprises instructions or statements that execute on the processor 101 or instructions or statements that are interpreted by instructions or statements that execute on the processor 101, to carry out the functions as further described below with reference to FIGS. 12, 13, 14, 15, 16, and 17. In an embodiment, the controller 266 is implemented in hardware via semiconductor devices, chips, logical gates, circuits, circuit cards, and/or other physical hardware devices in lieu of, or in addition to, a processor-based system.

The monitored class set 270 comprises identifiers of classes 258 that are monitored for potential movement from the classes 258 to the alternative memory location 160 or the secondary storage 125.

The compiler 268 creates the control flow graph 272 from the classes 258. The control flow graph 272 is a representation, using graph notation, of all execution paths that are possible for the classes 258 to traverse during the execution of the classes 258 on the processor 101.

The stack 154 is further described below with reference to FIG. 11. The suggestion command 156 is further described below with reference to FIG. 4. The notification command 158 is further described below with reference to FIG. 5. The alternative memory location 160 is further described below with reference to FIG. 9.

Figure 3:
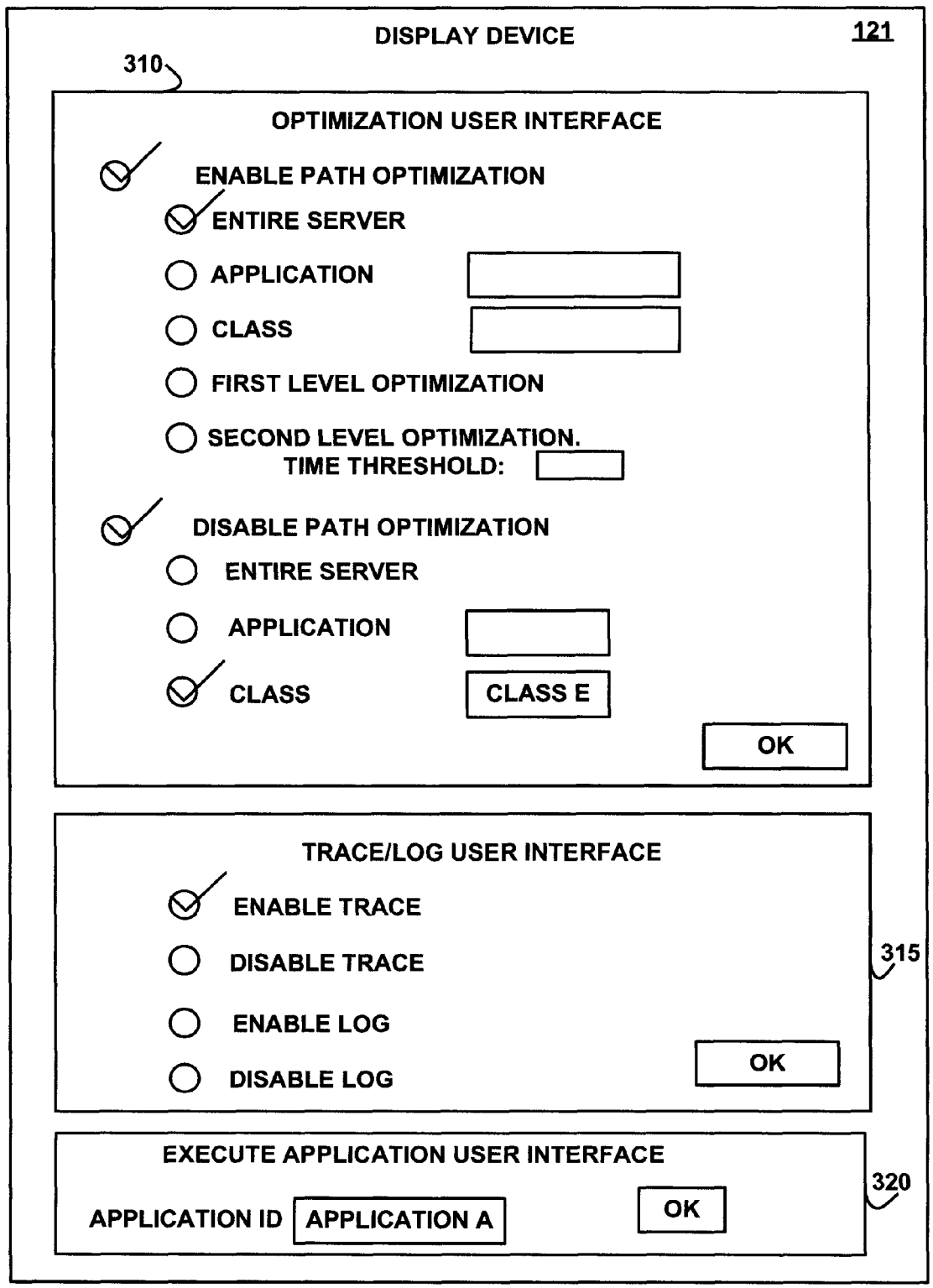
FIG. 3 depicts a block diagram of an example user interface displayed on a display device, according to an embodiment of the invention.

FIG. 3 depicts a block diagram of an example user interface displayed on a display device, such as the user terminal 121, according to an embodiment of the invention. In various embodiments, the controller 256 of the application server 150, an operating system, or any portion or combination thereof, displays the user interface on a video display screen of the user terminal 121, prints the user interface via a printer, or plays the user interface audibly via a speaker. The controller 256 of the application server 150, an operating system, or any portion or combination thereof, further receives commands and data from the user interface via a keyboard of the user terminal 121, via a mouse or other pointing device, via a microphone and a speech recognition program, or via an input device. In various embodiments, the user may enter and submit commands via dials, buttons, pop-up or pull-down menus, options, sliders, check boxes, a voice recognition system, or any other appropriate user interface.

The example user interface comprises an optimization user interface 310, a trace/log user interface 315, and an execute application user interface 320. The optimization user interface 310 sends an enable path optimization command and/or a disable path optimization command to the application server 150. The enable path optimization command specifies a request to enable path optimization for all of the classes 258 executed by the application server, specifies a request to enable path optimization for all classes in an application identified by the command, specifies a request to enable path optimization for a class identified by the command, specifies a request for first level optimization, and/or specifies a request for second level optimization and specifies a time threshold. The disable path optimization command specifies a request to disable path optimization for all classes executed in an application identified by the command, a request to disable path optimization for a class identified by the command, and/or a request to disable path optimization for all classes executed by the application server.

The trace/log user interface 315 sends, to the application server 150, an enable trace command, a disable trace command, an enable log command, and/or a disable log command. The enabled trace command specifies a request to enable path optimization for classes that perform a trace function. The disable trace command specifies a request to disable path optimization for classes that perform a trace function. The enable log command specifies a request to enable path optimization for classes that perform a log function. The disable log command specifies a request to disable path optimization for classes that perform a log function.

The execute application user interface 320 sends an execution command that requests execution of an application identified by the command to the application server 150.

FIG. 4 depicts a block diagram of an example suggestion command 156, according to an embodiment of the invention. The suggestion command 156 comprises a command identifier field 405, a class identifiers field 410, and an optimization level field 415. The command identifier field 405 identifies the command as a suggestion command and instructs the virtual machine 152 to start path optimization of the classes identified in the class identification field 410. The class identifiers field 410 specifies one or more class identifiers for which path optimization is requested by the suggestion command 156. The optimization level field 415 specifies either a first level optimization or a second level optimization and a time threshold value.

FIG. 5 depicts a block diagram of an example notification command 158, according to an embodiment of the invention. The notification command 158 comprises a command identifier field 505 and a class identifier field 510. The command identifier field 505 identifies the command 158 as a notification command and instructs the virtual machine 152 to stop path optimization of the classes identified in the class identification field 510. The class identification field 510 specifies one or more classes in the classes 258.

FIG. 6 depicts a block diagram of an example data structure for function data 264, according to an embodiment of the invention. The function data 264 comprises one or more records, such as the example records 602 and 604, each of which comprises a function identifier field 606 and a class identifier field 608. The function identifier field 606 specifies any appropriate functions, operations, or algorithms that are performed by methods of the classes specified in the associated class identifier field 608 of the same record. The class identifier field 608 specifies identifiers of the classes in the classes 258 that perform the respective associated function specified in the associated function identifier field 606 of the same record. In the example illustrated, the classes identified in the class identifier field 608 in the record 602 perform the trace function when executed. The trace function when executed saves data that describes the execution of other functions or applications. The trace function is typically used for debugging purposes, and the data saved by the trace is typically not a functional requirement of the application. In the example illustrated, the classes identified in the class identifier field 608 in the record 604 perform the log function when executed. The log function saves or logs data that describes errors or events that occur during execution of other functions or applications.

Figure 7:
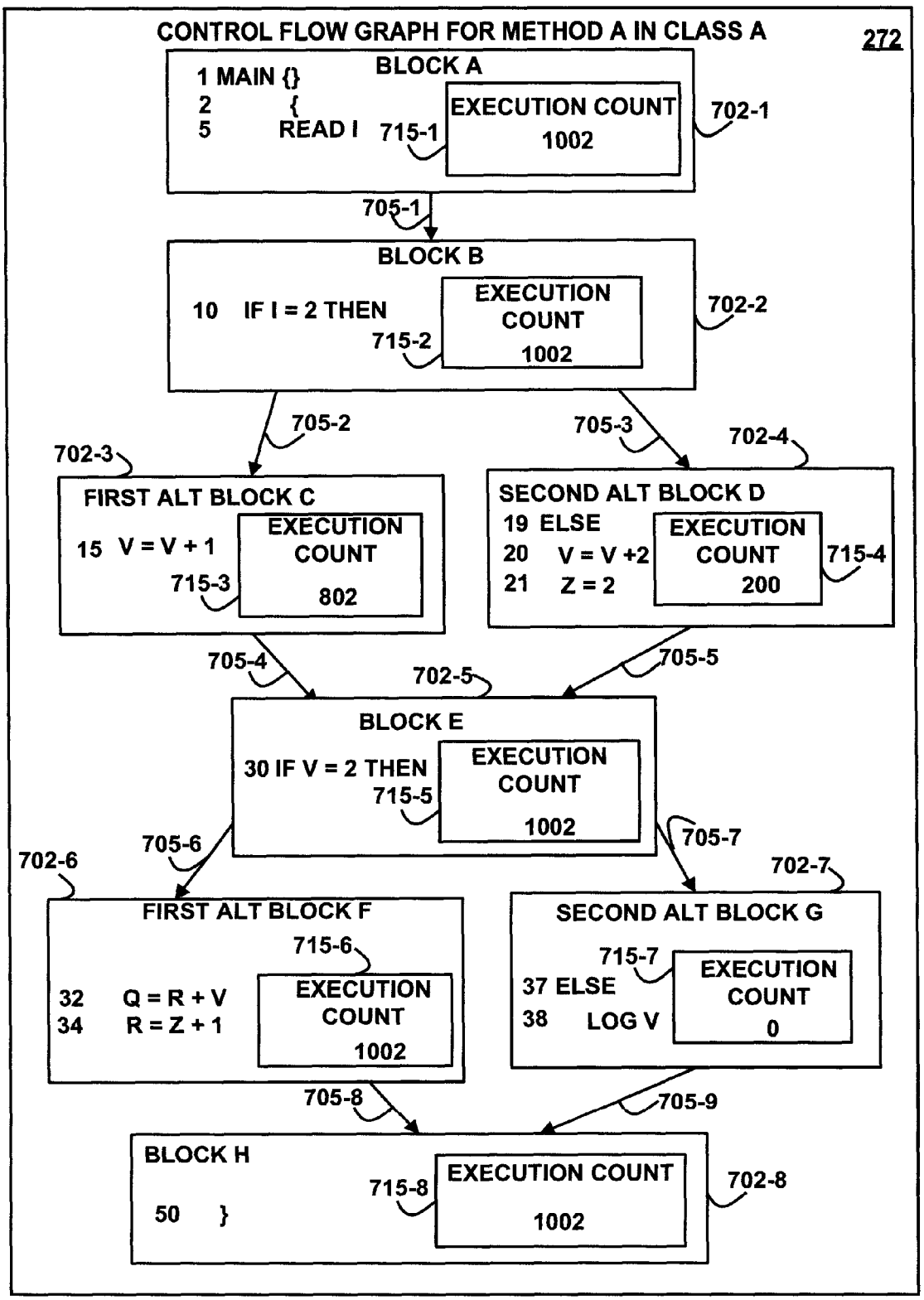
FIG. 7 depicts a block diagram of an example control flow graph, according to an embodiment of the invention.

FIG. 7 depicts a block diagram of an example control flow graph 272, according to an embodiment of the invention. The control flow graph 272 illustrates a variety of statements or instructions of the classes 258, each identified by a respective statement number. For example, the statement "READ I" is identified by the statement number "5." The statements are organized and divided into basic blocks 702-1, 702-2, 702-3, 702-4, 702-5, 702-6, 702-7, and 702-8.

A basic block is a unit of the classes 258 that comprises one or more statements or instructions. A basic block has only one entry point (i.e., no code, statement, or instruction within the basic block is the destination of a jump, call, or other control flow instruction), one exit point (i.e., control flow leaves the basic block via only one statement or instruction), and the basic block contains no jump instructions or other control flow statements (other than the possible exception of the last instruction in the basic block).

The start of a basic block may be jumped to, from more than one location within this or another class (when the method of the class executes on the processor 101). In various embodiments, the end of a basic block is a jump instruction or is the statement or instruction immediately before or prior to the destination of a jump instruction. Basic blocks are often the unit to which compiler optimizations are applied. Basic blocks form the vertices or nodes in the control flow graph 272. In various embodiments, the basic blocks may contain code, which may be source code, assembly code, executable instructions, interpretable statements, or any other type of code sequence.

To more formally define a basic block, a sequence of instructions forms a basic block if the instruction in each position in the sequence dominates, or always executes before, all those instructions in later (later in execution time within the control flow) positions within the sequence, and no other instruction executes between two instructions in the sequence. Thus, a basic block is allowed to include unconditional jumps to statements that are not targeted by other jumps within the basic block. The basic blocks to which control may next transfer after reaching the end of a basic block are called that basic block's successors, and the basic blocks from which control might have come when entering a basic block are called that basic block's predecessors. A basic block's predecessors are defined to be its immediate predecessors, meaning that no intervening block exists between a basic block and its predecessor block(s). Predecessor and successor blocks are defined by the possibility of flow control transfer, not actual flow control transfer during execution of the method of the class on the processor 101, since the actual path of control flow might not be capable of being determined by the compiler 268 until the classes 258 are executed.

In an embodiment, the compiler 268 generates basic blocks from a program listing of the instructions or statements that are included in the classes 258 by reading the program listing and marking basic block boundaries, which are the instructions that may either begin or end a basic block because those instructions either transfer control or accept control from another point or location within the classes 258. Then, the compiler 268 cuts the program listing at each of these points, and the basic blocks are the sequence of instructions between each of these points.

In various embodiments, instructions that end a basic block comprise unconditional and conditional branches or jumps (both direct and indirect); returns to a calling procedure; instructions that might throw, cause, or generate an exception, cause an interrupt, or generate an error; or function calls that might not return (such as functions that throw or generate exceptions, interrupts, or errors). Examples of conditional branches comprise if-then-else, do while, and do-until statements. In various embodiments, instructions that begin a new basic block include procedure and function entry points, targets of jumps or branches, fall-through instructions following conditional branches, instructions following other instructions that throw or generate exceptions, and exception handlers.

The control flow graph 272 is a representation, using graph notation, of all execution paths through the basic blocks 702-1, 702-2, 702-3, 702-4, 702-5, 702-6, 702-7, and 702-8 that are possible for the execution of the program represented by the control flow graph to traverse. Each node in the control flow graph 272 represents a basic block in the classes 258. The directed edges 705-1, 705-2, 705-3, 705-4, 705-5, 705-6, 705-7, 705-8, and 705-9 between the basic blocks represent changes in the control flow of the classes 258 caused by control flow statements in the classes. Directed edges have an associated direction, meaning that the flow of control of the basic blocks flows from the node at the tail of the directed edge to the node pointed to by the head of the directed edge, but the flow of control does not flow from the node pointed to by the head to the node at the tail.

Control flow (or alternatively, flow of control) refers to the order in which the basic blocks and the order in which the individual statements, instructions and/or function calls of the basic blocks are executed by the processor 101. A control flow statement is an instruction that, when executed, can cause (conditionally or unconditionally) a change in the subsequent control flow to differ from the natural sequential order (i.e., from beginning to end or top to bottom), in which the instructions in the basic blocks are listed within the program listing of the classes 258.

The types of control flow statements available differ between programming languages, but may be categorized by their effect on the order of the basic blocks as follows:

1) a statement that causes flow control to continue at a different statement (a jump);

2) a statement that causes a set of statements to be executed only if a condition is met or a expression evaluates to true (a choice or condition);

3) a statement that causes a set of statements to be executed zero or more times, until a condition is met or while a condition is met (a loop);

4) a statement that causes a set of distant statements to be executed, after which the flow of control may possibly return (a call or invocation of a subroutine, subprocedure, method, or another program); and 5) a statement that stops or halts execution of the classes 258 on the processor 101, which prevents any further execution of the classes 258, unless and until the execution is restarted.

In an embodiment, control flow statements work (when executed) by altering the program counter used by the processor to determine the next statement or instruction to execute. As used herein, control flow is restricted to a single thread of execution, as it depends upon a definite sequence in which instructions are executed by the processor, one at a time.

The compiler 268 creates the control flow graph 272 to represent the possible execution paths because the actual execution path is often dependent on values of data that the methods of the classes read when they execute, and the compiler 268 does not necessarily know those values since the compiler creates the control flow graph 272 prior to some or all of the statements of the methods being executed. For example, whether block 702-3 or 702-4 is executed depends on the value of the variable "I," which is not known until it is read by the execution of the block 702-1 and compared against "2" by the execution of the block 702-2.

The control flow graph 272 includes two specially designated basic blocks: the entry block 702-1, through which control enters into the control flow graph 272, and the exit basic block 702-8, through which all control leaves the control flow graph 272. Thus, a path is an alternating sequence of nodes and directed edges that starts at the entry node 702-1 and terminates at the exit node 702-8.

The compiler 268 stores an execution count 715-1, 715-2, 715-3, 715-4, 715-5, 715-6, 715-7, and 715-8 in the respective basic blocks 702-1, 702-2, 702-3, 702-5, 702-6, and 702-8. In another embodiment, the execution counts are associated with the respective basic blocks, but are stored in separate memory locations from the basic blocks. The execution counts are the respective counts or numbers of times that the respective basic blocks were executed during the execution of the method of the class on the processor 101. In the example of FIG. 7, the basic block 702-6 has an execution count 715-6 of "1002," meaning that the basic block 702-6 has been executed by the processor 101 "1002" times since the execution count was initialized while the basic block 702-7 has an execution count 715-7 of "0," meaning that the basic block 702-7 has been executed by the processor 101 "0" times since the execution count was initialized.

Figure 8:
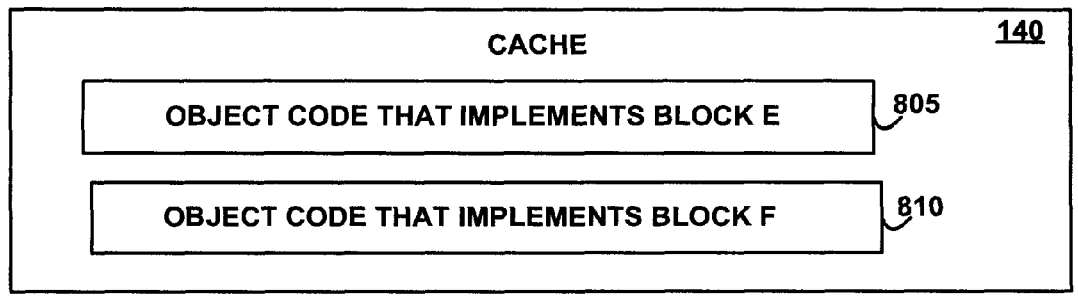
FIG. 8 depicts a block diagram of an example cache, according to an embodiment of the invention.

FIG. 8 depicts a block diagram of example contents of the cache 140, according to an embodiment of the invention The cache 140 includes object code instructions that implement source code of the classes. In the example of FIG. 8, the cache 140 includes the object code 805, which implements the source code of the basic block 702-5 when executed by the processor 101, and the object code 810, which implements the source code of the basic block 702-6 when executed by the processor 101.

Figure 9:
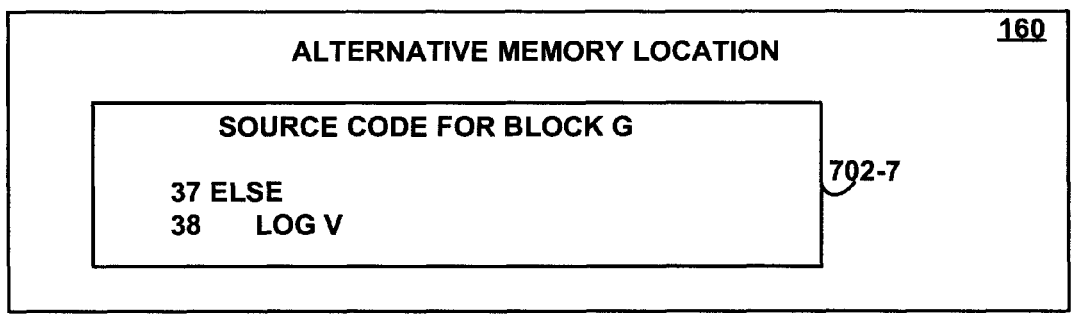
FIG. 9 depicts a block diagram of an example alternative memory location, according to an embodiment of the invention.

FIG. 9 depicts a block diagram of example contents of the alternative memory location 160, according to an embodiment of the invention. In an embodiment, the alternative memory location 160 is in a larger, slower, or less expensive memory device than the memory device or devices that store the classes 258. The alternative memory location 160 includes portions of the source code that the compiler 268 moved from the classes 258 to the alternative memory location 160, such as the source code 702-7. By moving the source code 702-7 to the alternative memory location 160, the compiler 268 deleted the source code 702-7 from the classes 258 in the application server 150.

Figure 10:
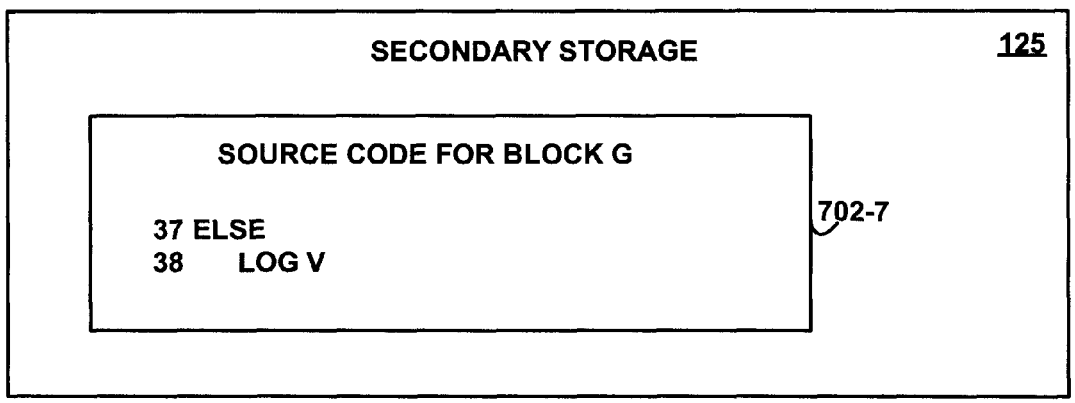
FIG. 10 depicts a block diagram of example secondary storage, according to an embodiment of the invention.

FIG. 10 depicts a block diagram of example contents of the secondary storage 125, according to an embodiment of the invention. In an embodiment, the secondary storage 125 is a larger, slower, or less expensive memory device than the memory 102, in which the classes 258 are stored. The secondary storage 125 comprises portions of the source code that the compiler 268 moved from the classes 258 to the secondary storage 125, such as the source code 702-7. By moving the source code 702-7 to the secondary storage 125, the compiler 268 deleted the source code 702-7 from the classes 258 in the memory 102.

Figure 11:
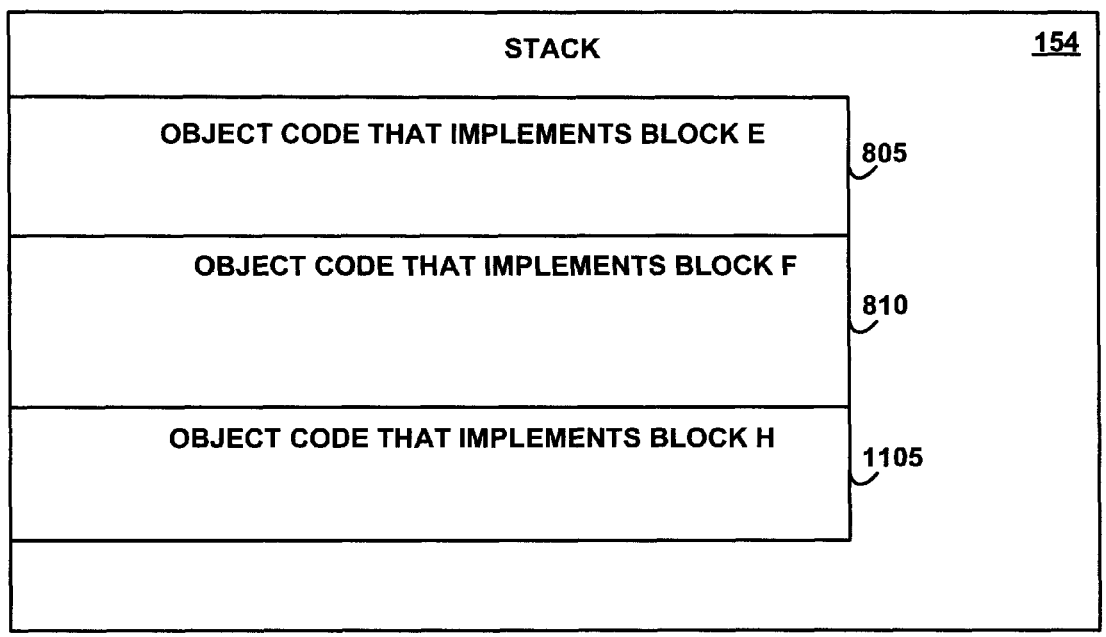
FIG. 11 depicts a block diagram of an example stack, according to an embodiment of the invention.

FIG. 11 depicts a block diagram of an example stack 154, according to an embodiment of the invention. The stack 154 includes the contents of a call stack, invocation stack, or program stack of the instructions that execute on the processor 101. The stack 154 comprise entries for object code instructions that have not yet executed on the processor and are waiting to execute on the processor. The call stack 154 may comprise object code instructions, such as the object code 805, 810, and 1105, that the compiler 268 compiled to implement portions of the classes 258. The object code 805 comprises instructions that implement the basic block 702-5. The object code 810 comprises instructions that implement the basic block 702-6. The object code 1105 comprises instructions that implement the basic block 702-8.

A stack is a data structure that works on the principle of Last In First Out (LIFO), meaning that the last entry put on the stack is the first item that is removed from the stack. The stack 154 is a stack because when one method calls another, rather than simply jumping to another part of the application, the current address in the caller method is pushed onto the stack. Its value is then used when the callee method (the method that was called) terminates, by popping the callee method's information off the stack 154 and restoring the program counter back to the value that was stored there.

Figure 12:
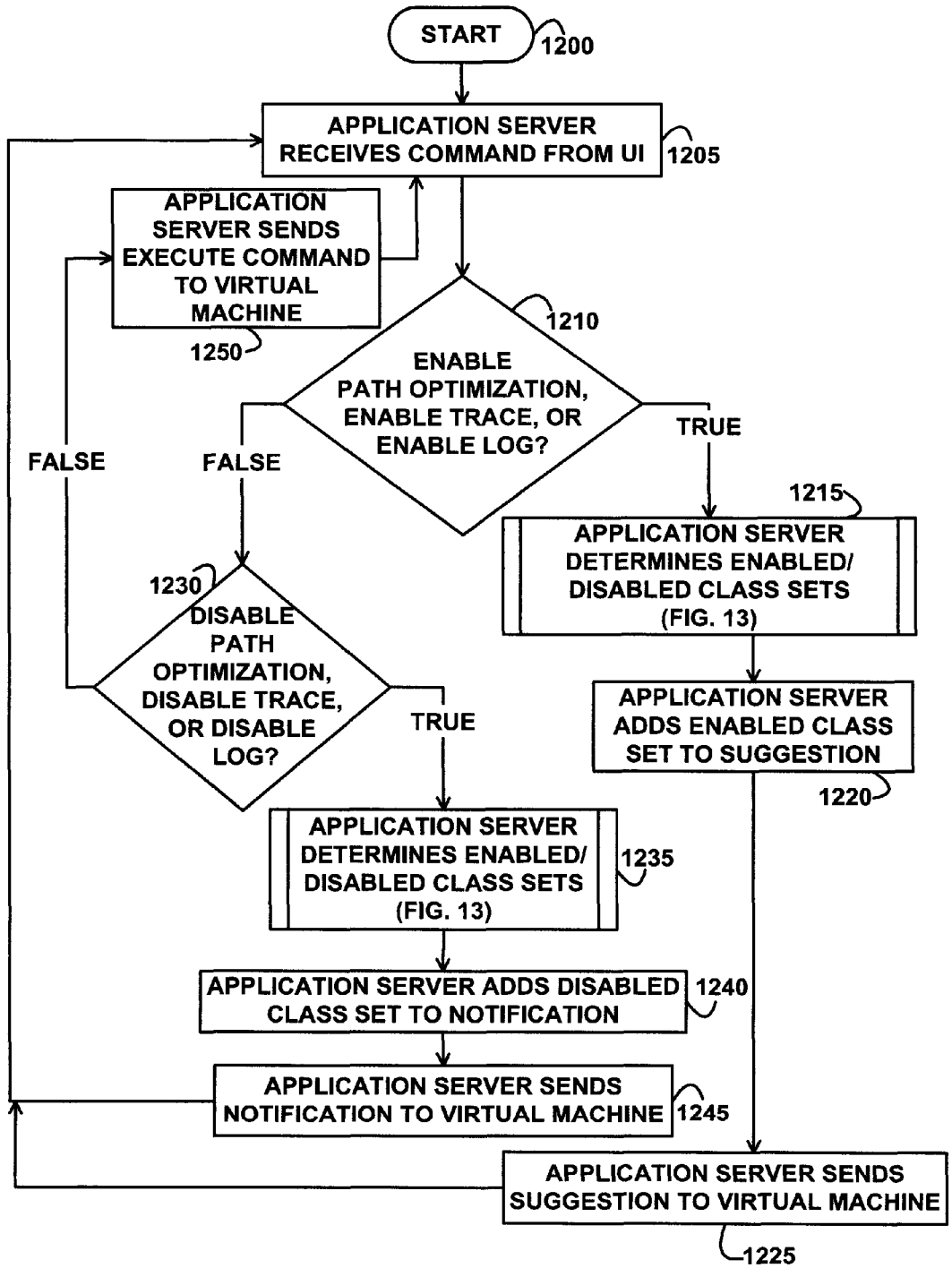
FIG. 12 depicts a flowchart of example processing for an application server, according to an embodiment of the invention.

FIG. 12 depicts a flowchart of processing for an application server, according to an embodiment of the invention. Control begins at block 1200. Control then continues to block 1205 where the application server 150 receives a command from the user interface 310, 315, or 320 via the user terminal 121.

Control then continues to block 1210 where the application server 150 determines whether the received command was an enable path optimization command, an enable trace command, or an enable log command.

If the determination at block 1210 is true, then the received command was an enable path optimization command, an enable trace command, or an enable log command, so control then continues to block 1215 where the application server 150 determines the enabled and disabled class sets, as further described below with reference to FIG. 13.

Control then continues to block 1220 where the application server 150 adds the enabled class set 260 to the class identifiers 410 of the suggestion command 156. Control then continues to block 1225 where the application server 150 sends the suggestion command 156 to the virtual machine 152. Control then returns to block 1205 where the application server 150 receives another command from the user interface, as previously described above.

If the determination at block 1210 is false, then the received command was not an enable path optimization command, an enable trace command, or an enable log command, so control continues to block 1230 where the application server 150 determines whether the received command was a disable path optimization command, a disable trace command, or a disable log command. If the determination at block 1230 is true, then received command was a disable path optimization command, a disable trace command, or a disable log command, so control continues to block 1235 where the application server 150 determines the enabled/disabled class sets, as further described below with reference to FIG. 13.

Control then continues to block 1240 where the application server 150 adds the determined disabled class set 262 to the notification command 158. Control then continues to block 1245 where the application server 150 sends the notification command 158 to the virtual machine 152. Control then returns to block 1205 where the application server 150 receives another command from the user interface, as previously described above.

If the determination at block 1230 is false, then the received command was an execute command, so control continues to block 1250 where the application server 150 sends an execute command and an identifier of the application to execute to the virtual machine 152. Control then returns to block 1205 where the application server 150 receives another command from the user interface, as previously described above.

Figure 13:
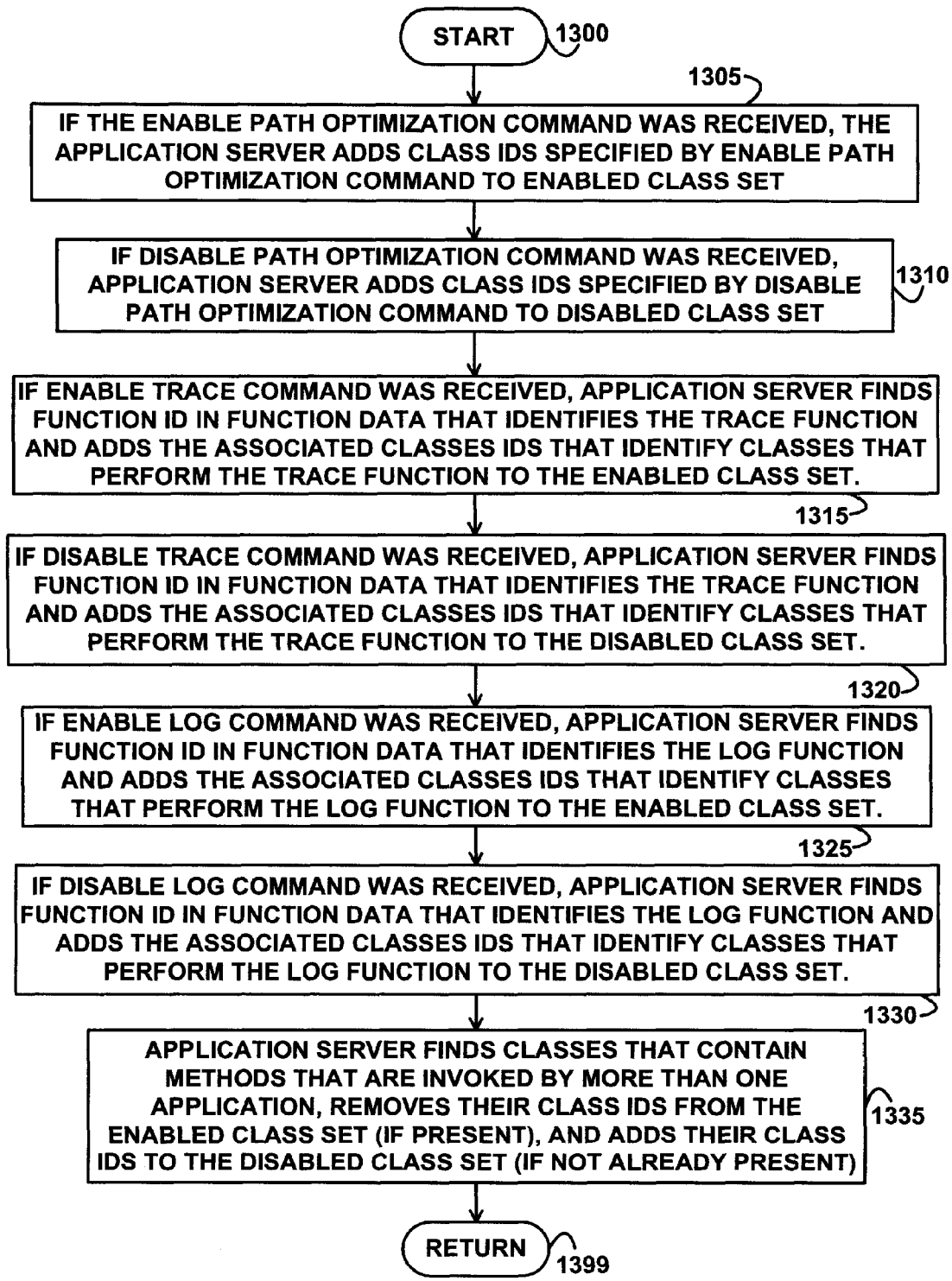
FIG. 13 depicts a flowchart of example processing for determining enabled and disabled class sets, according to an embodiment of the invention.

FIG. 13 depicts a flowchart of processing for determining enabled and disabled class sets, according to an embodiment of the invention. Control begins at block 1300. Control then continues to block 1305 where if the enable path optimization command was received, then the application server 150 adds the class identifiers that are specified by the enable path optimization command to the enabled class set 260.

Control then continues to block 1310 where if the disable path optimization command was received, then the application server 150 adds the class identifiers that are specified by the disable path optimization command to the disabled class set 262.

Control then continues to block 1315 where if the enable trace command was received, the application server 150 finds the function identifier in the function data that identifies the trace function and adds the associated classes identifiers that identify the classes that perform the trace function to the enabled class set 260.

Control then continues to block 1320 where if the disable trace command was received, then the application server 150 finds the function identifier in the function data that identifies the trace function and adds the associated classes identifiers that identify the classes that perform the trace function to the disabled class set 262.

Control then continues to block 1325 where if the enable log command was received, the application server 150 finds the function identifier in the function data that identifies the log function and adds the associated classes identifiers that identify classes that perform the log function to the enabled class set 260.

Control then continues to block 1330 where if the disable log command was received, the application server 150 finds the function identifier in the function data that identifies the log function and adds the associated classes identifiers that identify classes that perform the log function to the disabled set 262.

Control then continues to block 1335 where the application server 150 finds the class identifiers of classes that contain methods that are invoked by more than one application, removes those found class identifiers from the enabled class set 260 (if present), and adds those found class identifiers to the disabled class set 262 (if not already present). In the example of FIG. 2, the class H 258-8 is invoked by more than one application (is invoked by both the class B 258-2 in the application A 205 and by the class D 258-4 in the application B 210), so the application server 150 removes the identifier of the class H 258-8 from the enabled class set 260 and adds the class identifier of the class H 258-8 to the disabled class set 262. In an embodiment, the application server 150 performs the processing of block 1335 because service classes that are called by only one application have execution counts that result from invocations from only one application, which makes the service classes that are called by only one application better candidates for the path optimization (performed by FIGS. 15 and 16) than are the service classes that are called by multiple applications.

Control then continues to block 1399 where the logic of FIG. 13 returns.

Figure 14:
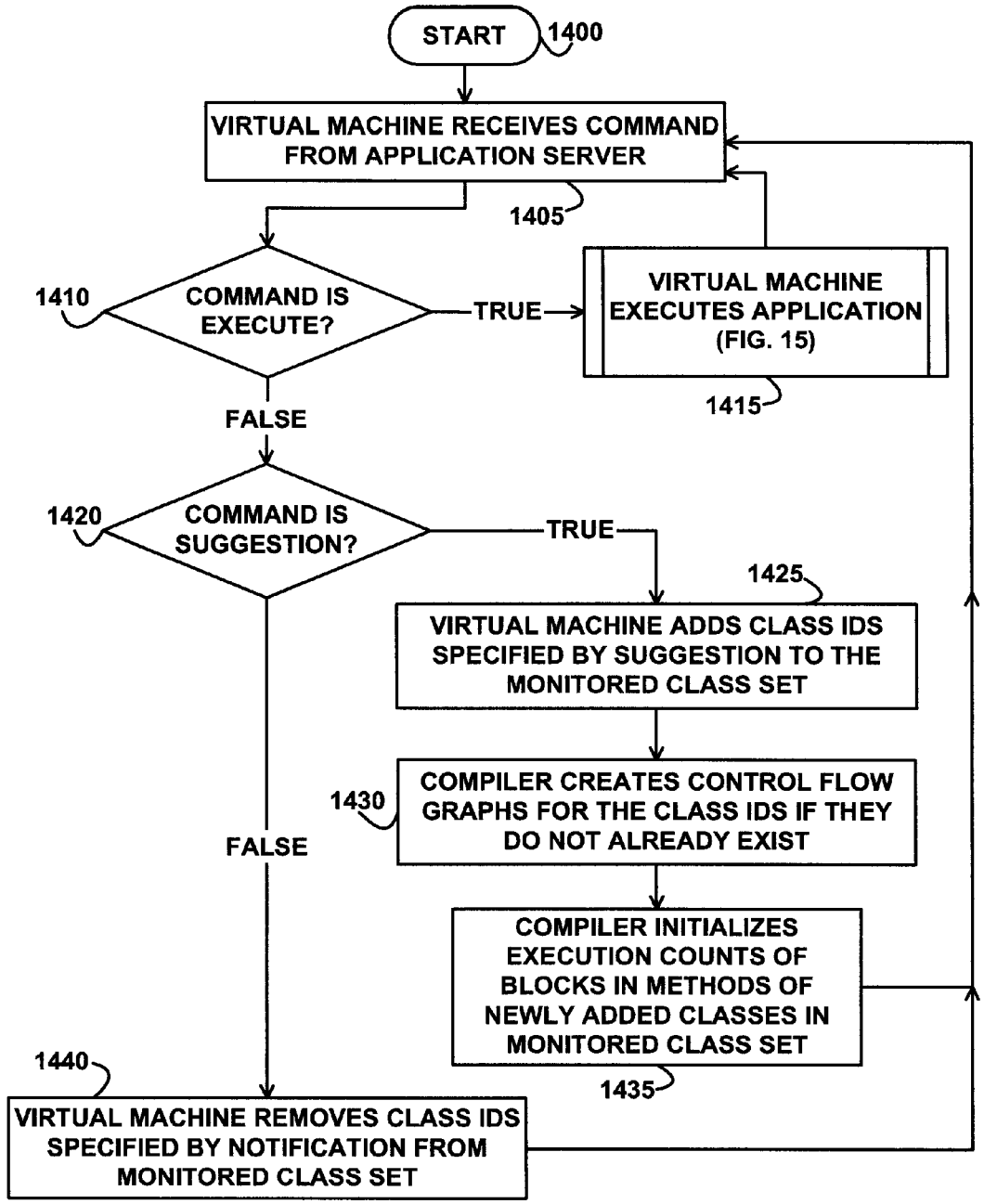
FIG. 14 depicts a flowchart of example processing for a virtual machine, according to an embodiment of the invention.

FIG. 14 depicts a flowchart of processing for a virtual machine, according to an embodiment of the invention. Control begins at block 1400. Control then continues to block 1405 where the virtual machine 152 receives a command from the application server 150.

Control then continues to block 1410 where the virtual machine 152 determines whether the received command is an execute command. If the determination at block 1410 is true, then the received command is an execute command that identifies an application to execute, so control then continues to block 1415 where the virtual machine 152 executes the identified application, as further described below with reference to FIG. 15. Control then returns to block 1405 where the virtual machine 152 receives another command from the application server 150, as previously described above.

If the determination at block 1410 is false, then the received command is not an execute command, so control then continues to block 1420 where the virtual machine 152 determines whether the received command is a suggestion command. If the determination at block 1420 is true, then the received command is the suggestion command 156, so control continues to block 1425 where the virtual machine 152 adds the class identifiers specified by the suggestion command 156 to the monitored class set 270.

Control then continues to block 1430 where the virtual machine 152 creates control flow graphs for the classes identified by the class identifiers in the monitored class set 270 if those control flow graphs do not already exist.

Control then continues to block 1435 where the virtual machine 152 initializes execution counts to zero for the basic blocks in the methods of the newly added classes in the monitored class set 270. Control then returns to block 1405 where the virtual machine 152 receives the next command from the application server 150, as previously described above.

If the determination at block 1420 is false, then the received command is a notification command 158, so control then continues to block 1440 where the virtual machine 152 removes the class identifiers specified by the notification command 158 from the monitored class set 270. Control then returns to block 1405 where the virtual machine 152 receives the next command from the application server 150, as previously described above.

Figure 15:
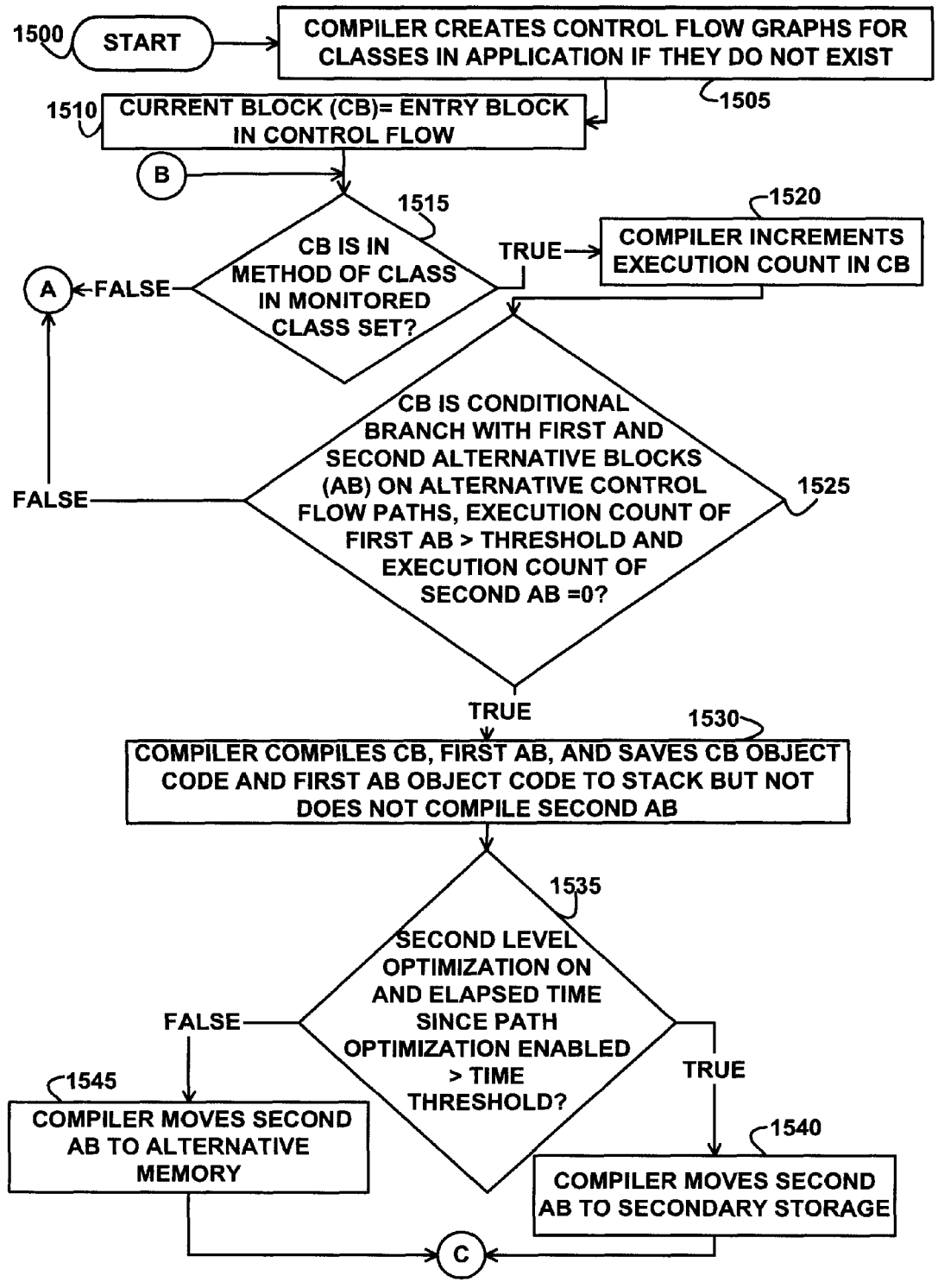
FIG. 15 depicts a flowchart of example processing for a compiler, according to an embodiment of the invention.
Figure 16:
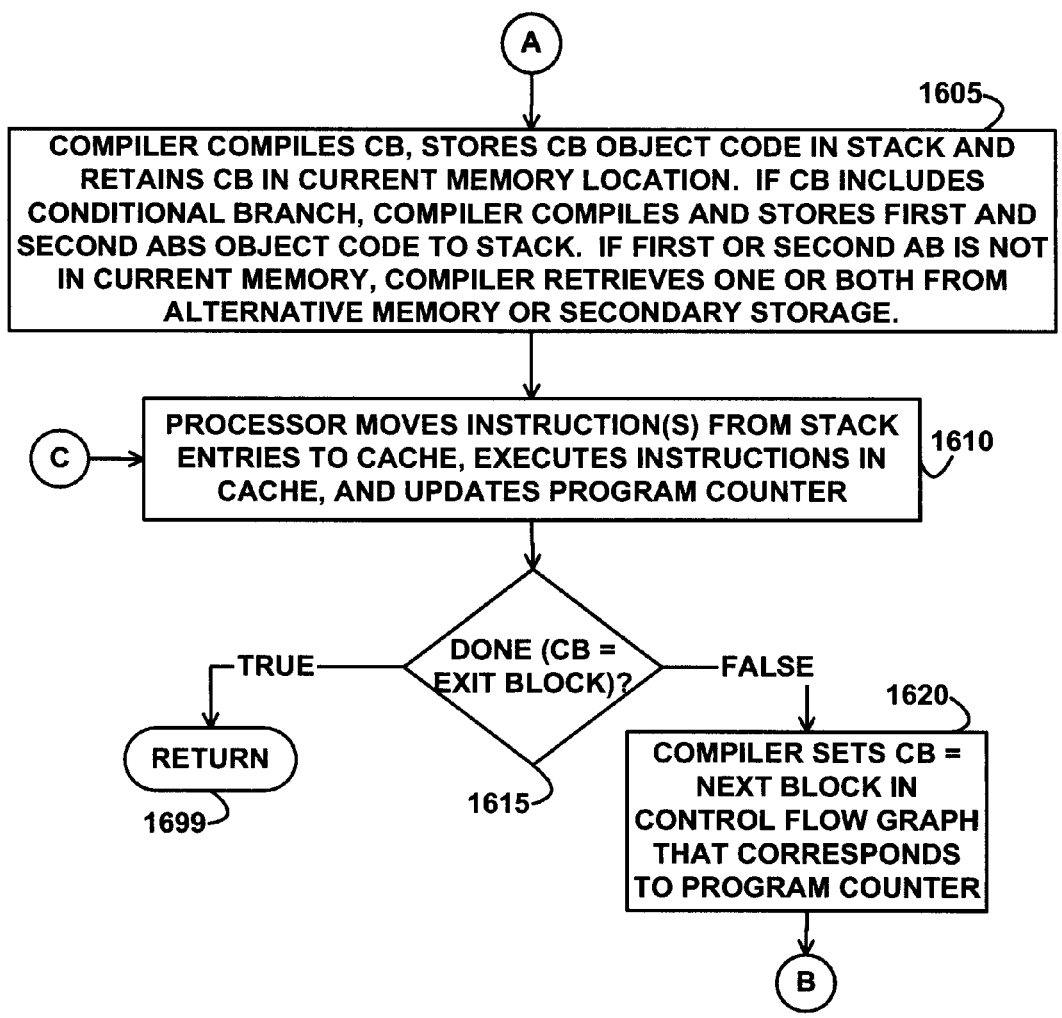
FIG. 16 depicts a flowchart of further example processing for a compiler, according to an embodiment of the invention.

FIGS. 15 and 16 depict flowcharts of processing for a compiler, according to an embodiment of the invention. Control begins at block 1500 in FIG. 15. Control then continues to block 1505 where the compiler 268 reads the classes 258 in the application and service classes used by the application and creates the control flow graphs 272 for classes in the application being compiled and the service classes used by the application and initializes execution counts of block in the methods of the control flow graphs 272 if the control flow graphs do not already exist. If the control flow graphs do already exist, then the compiler does not initialize the execution counts in the control flow graphs, but instead allows the execution counts to continue to accumulate across invocations of the application and service classes.

Control then continues to block 1510 where the compiler 268 sets the current basic block (CB) to be the entry basic block in the control flow graph 272. Control then continues to block 1515 where the compiler 268 determines whether the current basic block is in a method of a class that is a member of the monitored class set 270.

If the determination at block 1515 is true, then the current basic block is in a method of a class in the monitored class set 270, so control continues to block 1520, where the compiler 268 increments the execution count that is in or that is associated with the current basic block, reflecting the number of times that the current basic block has been executed. Control then continues to block 1525 where the compiler 268 determines whether the current basic block contains a conditional branch with first and second alternative basic blocks (AB) on alternative control flow paths and the execution count of the first alternative basic block is greater than a threshold value and the execution count of the second alternative basic block is equal to zero. The conditional branch selects between execution of the first and second alternative basic blocks, causing control flow execution to either traverse a path that comprises the first alternative basic block or to traverse a path that comprises the second alternative basic block, depending on the result of a compare operation performed by the conditional branch.

If the determination at bock 1525 is true, then the current basic block is a conditional branch that selects between first and second alternative blocks (AB) on alternative control flow paths and the execution count of the first alternative basic block is greater than a threshold value and the execution count of the second alternative basic block is equal to zero, so control continues to block 1530 where the compiler 268 compiles the current basic block into current basic block object code, compiles the first alternative basic block into first alternative basic block object code, stores the current basic block object code to the stack 154, and stores the first alternative basic block object code to the stack 154, but does not compile the second alternative basic block.

Control then continues to block 1535 where the compiler 268 determines whether the second level optimization is on and the elapsed time since the path optimization was enabled via the enable path optimization command is greater than the time threshold value.

If the determination at block 1535 is true, then the second level optimization is on and the elapsed time since the path optimization was enabled is greater than the time threshold value, so control continues to block 1540 where the compiler 268 moves the second alternative basic block from the classes 258 in the main memory 102 to the secondary storage 125, deleting the second alternative basic block from the classes 258 in the main memory 102. The next time the application is executed, the moved second alternative basic block source code is not in the classes 258, so the compiler does not read it at block 1505, which saves memory space in the memory 102 and saves processing time. Control then continues to block 1610 in FIG. 16 where the processor moves instructions from the stack entries to the cache 140, executes instructions in the cache 140, and updates the program counter to point to the next instruction to be executed within the application.

The processor executes a sequence of stored instructions called a program. The instructions in the program are represented by a series of numbers stored in memory. The processor uses four steps: fetch, decode, execute, and write back.

In the fetch step, the processor retrieves an instruction from the cache 140 or from the stack 154 if no instructions execute in the cache 140. The processor determines the location in the cache 140 or in the stack 154 from a program counter, which stores a number that identifies the current position in the application. Stated another way, the program counter keeps track of the processor's place within the execution control flow of the currently executing application. After the processor fetches an instruction, the processor increments the program counter by the length of the instruction within the cache. The processor uses the instruction to determine the action that the processor takes, as further described below.

In the decode step, the processor breaks the instruction into parts, which have significance to other portions of the processor. The way in which the processor interprets the numerical values of the instruction parts is defined by the processor's instruction set architecture. In an embodiment, one group of numbers in the instruction, called the opcode, indicates which operation the processor is to perform in response to the instruction. The remaining parts of the number provide information required for that instruction, such as operands for an operation. In various embodiment, the instruction specifies the operands as constant values (also called an immediate value), or as a location of a value, such as a register or a memory address.

In the execute step, various connected portions of the processor perform the operation specified by the instruction. For example, if the instruction specifies an addition operation, the processor uses an arithmetic logic unit (ALU), which is connected to a set of inputs and a set of outputs. The inputs provide the numbers to be added, and the outputs contain the final sum. The ALU contains the circuitry to perform simple arithmetic and logical operations on the inputs (such as addition and bitwise operations).

In the write back step, the processor writes back or stores the results of the execute step to memory or to an internal processor register, which allow fast access by subsequently-executed instructions. In other cases, results may be written to slower, but less expensive and larger, main memory. In response to some types of instructions, the processor manipulates the program counter rather than directly producing result data. Instructions that cause manipulation of the program counter include jumps, loops, conditional jumps, and conditional branches. Some instructions cause the processor to change the state of a flags register. The processor uses these flags to influence subsequent instructions. For example, in response to a compare instruction, the processor compares two values and sets a number in the flags register according to which one is greater. This flag could then be used by a later jump instruction to determine program flow via changing the program counter.

After the execution of the instruction and write back of the resulting data, the entire process repeats, with the next instruction cycle normally fetching the next-in-sequence instruction because of the incremented value in the program counter. But, if the completed instruction was a jump, the processor modifies the program counter to contain the address of the instruction that was jumped to, and program execution continues normally beginning at the jumped-to address. In another embodiment, the processor fetches, decodes, and executes multiple instructions simultaneously.

Control then continues to block 1615 where the compiler 268 determines whether execution of the application is done, i.e., the compiler 268 determines whether the current basic block in the control flow graph 272 equals the exit basic block.

If the determination at block 1615 is true, then the current basic block in the control flow graph 272 equals the exit basic block, so control continues to block 1699 where the logic of FIGS. 15 and 16 returns.

If the determination at block 1615 is false, then the current basic block in the control flow graph 272 does not equal the exit basic block, so control continues to block 1620 where the compiler 268 sets the current basic block to be the next basic block in the control flow graph 272 that corresponds to the program counter (that contains the instruction pointed to by the program counter). Control then returns to block 1515 of FIG. 15 where the compiler 268 determines whether the current basic block is in a method of a class in the monitored class set 270, as previously described above.

If the determination at block 1535 is false, then the second level optimization is not on or the elapsed time since the path optimization was enabled is not greater than the time threshold value, so control continues to block 1545 where the compiler 268 moves the second alternative basic block source code from the classes 258 in the application server 150 to the alternative memory location 160, deleting the second alternative basic block source code from the classes 258. The next time the application is executed, the moved second alternative basic block source code is not in the classes 258, so the compiler does not read it at block 1505, which saves processing time. Control then continues to block 1610 of FIG. 16 where the processor moves instructions from the stack entries to the cache 140, executes instructions in the cache 140, and updates the program counter, as previously described above.

If the determination at block 1525 is false, then the current basic block is not a conditional branch with first and second alternative blocks (AB) on alternative control flow paths or the execution count of the first alternative basic block is not greater than a threshold value or the execution count of the second alternative basic block is not equal to zero, so control continues to block 1605 of FIG. 16 where the compiler 268 compiles the current basic block into current basic block object code, stores the current basic block object code into the stack 154 and retains the current basic block source code in its current memory location in the classes 258 in the application server 150. If the current basic block comprises a conditional branch, the compiler 268 compiles and stores both first and second alternative basic blocks of the conditional branch into first alternative object code and second alternative object code and stores them in stack entries in the stack 154. If the first or second alternative basic blocks are not in the classes 258 in the application server 150, the compiler 268 retrieves one or both from the alternative memory location 160 or the secondary storage 125 prior to the compilation into the object code. Control then continues to block 1610, as previously described above.

If the determination at block 1515 is false, then the current basic block is not in a method of a class in the monitored class set 270, so control continues to block 1605, as previously described above, without performing the above-described optimization.

Figure 17:
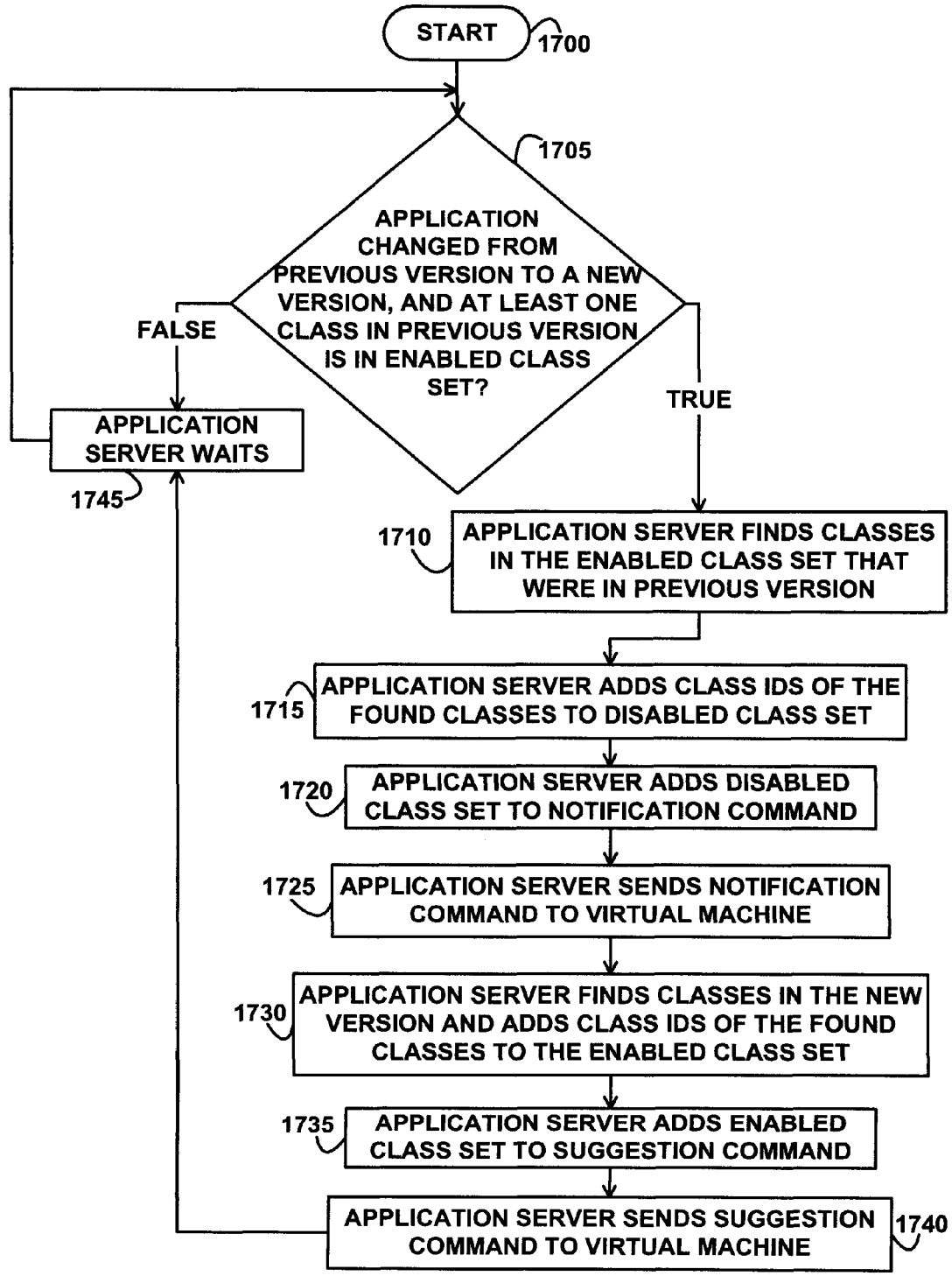
FIG. 17 depicts a flowchart of example processing for handling changes to an application, according to an embodiment of the invention.

FIG. 17 depicts a flowchart of further processing for handling changes to an application, according to an embodiment of the invention. In various embodiments, the logic of FIG. 17 executes concurrently, or substantially concurrently, with the logic of FIG. 12 or executes periodically.

Control begins at block 1700. Control then continues to block 1705 where the application server 150 determines whether the application has changed from a previous version to a new version, and at least one class 258 in the previous version is a member of the enabled class set 260. In various embodiments, the application server 150 determines whether the application has changed by detecting whether classes have been added to or deleted from the application to form a new version of the application from a previous version of the application or by detecting whether code statements or instructions within existing classes of the application have been changed, modified, or updated from a previous version to a new version. In various embodiments, the application server 150 performs the detecting by receiving messages from an integrated development environment that edits or performs additions, deletions, and modifications to the classes 258 or by detecting change indications or flags stored in, or associated with, the classes 258.

If the determination at block 1705 is true, then the application has changed from a previous version to a new version, and at least one class in the previous version is a member of the enabled class set 260, so control continues to block 1710 where the application server 150 finds classes in the enabled class set 260 that were present in the previous version of the application.

Control then continues to block 1715 where the application server 150 adds the class identifiers of the classes 258 that were found in the enabled class set 260 and that were found to be present in the previous version to the disabled class set 262.

Control then continues to block 1720 where the application server 150 adds the disabled class set 262 to the class identifiers 510 in the notification command 158.

Control then continues to block 1725 where the application server 150 sends the notification command 158 that comprises the disabled class set 262 to the virtual machine 152. The virtual machine 152 receives and processes the notification command 158, as previously described above with reference to FIG. 14.

Control then continues to block 1730 where the application server 150 finds classes in the new version of the application and adds the class identifiers of the found classes in the new version to the enabled class set 260. In an embodiment, the application 150 only adds the class identifiers that are specified by the enable path optimization command of the optimization user interface 310.

Control then continues to block 1735 where the application server 150 adds the enabled class set 260 to the class identifiers field 410 in the suggestion command 156.

Control then continues to block 1740 where the application server 150 sends the suggestion command 156 that contains the enabled class set 260 to the virtual machine 152. The virtual machine 152 receives and processes the suggestion command 156, as previously described above with reference to FIG. 14.

Control then continues to block 1745 where the application server 150 waits for a period of time. Control then returns to block 1705 where the application server 150 once again determines whether the application has changed and at least one class in the previous version is a member of the enabled class set 260, as previously described above.

If the determination at block 1705 is false, then the application has not changed from a previous version to a new version or no class in the previous version is a member of the enabled class set 260, so control continues to block 1745 where the application waits for a period of time and refrains from performing the processing of blocks 1710, 1715, 1720, 1725, 1730, 1735, and 1740, which allows the execution counts to continue to accumulate while the application remains unchanged. Control then returns to block 1705, as previously described above.

Consider the following example operation of FIGS. 12, 13, 14, 15, 16, and 17. The application 205 uses a container A, and the application 210 uses a container B. In response to an enable path optimization command from the optimization user interface 310, the application server 150 sends a suggestion command 156 to the virtual machine 152. In response to the suggestion command 156, the virtual machine 152 optimizes the code for containers A and B during a period of uninterrupted production while no changes to the applications occur. Subsequently, the application 205 is updated from the previous version to a new version, and the application server 150 detects that update. The application server 150 also detects that application 205 uses the container A, and the application server 150 employs an internal mapping to determine the classes that are included in the container A.

In response to these detections and determinations, the application server 150 issues the notification command 158 to the virtual machine 152, which instructs the virtual machine 152 to undo the optimization to the determined classes because the new version of the application might use different code paths through the classes 258. The container B and the application 210 are allowed to retain their optimized code since the application 210 did not change. The application server 150 then sends the suggestion command 156 to the virtual machine 152, which instructs the virtual machine 152 to re-start the optimization to container A (the classes of the application 205) based on new execution counts within the new code paths of the new version. Thus, the detection of the change to an application by the application server causes the virtual machine to re-initialize the execution counts in the application to zero.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
    detecting a conditional branch that selects between execution of a first alternative block and a second alternative block;
    saving a first count of a number of times the first alternative block was executed and a second count of a number of times the second alternative block was executed;
    if the first count is greater than a threshold and the second count equals zero, compiling the first alternative block into first alternative block object code and refraining from compiling the second alternative block;
    if the first count is not greater than the threshold, compiling the first alternative block into the first alternative block object code, compiling the second alternative block into second alternative block object code, and moving the first alternative block object code and the second alternative block object code to a processor cache; and
    if the second count does not equal to zero, compiling the first alternative block into the first alternative block object code, compiling the second alternative block into the second alternative block object code, and moving the first alternative block object code and the second alternative block object code to the processor cache.

2. The method of claim 1, further comprising:
    if the first count is greater than the threshold, the second count equals zero, and an elapsed time since path optimization was enabled is greater than a time threshold, moving the second alternative block to secondary storage and during a subsequent compilation, reading the conditional branch and the first alternative block from memory and refraining from reading the second alternative block from the secondary storage.

3. The method of claim 1, further comprising:
    detecting whether an application that comprises the conditional branch, the first alternative block, and the second alternative block has changed from a previous version to a new version; and
    if the application has changed, initializing the first count and the second count to zero.

4. The method of claim 3, further comprising:
    if the application has not changed, refraining from initializing the first count and the second count to zero.

5. The method of claim 1, further comprising:
    if the first count is greater than the threshold and the second count equals zero, moving the first alternative block object code to a processor cache, wherein the processor reads the first alternative block object code from the processor cache and executes the first alternative block object code.

6. The method of claim 1, further comprising:
    determining whether a class that comprises the conditional branch, the first alternative block, and the second alternative block is a member of a monitored set;
    if the class is the member of the monitored set, performing the saving; and
    if the class is not the member of the monitored set, refraining from performing the saving.

7. A non-transitory computer-readable storage medium, comprising:
    detecting a conditional branch that selects between execution of a first alternative block and a second alternative block;
    saving a first count of a number of times the first alternative block was executed and a second count of a number of times the second alternative block was executed; and
    if the first count is greater than a threshold and the second count equals zero, compiling the first alternative block into first alternative block object code and refraining from compiling the second alternative block;
    if the first count is not greater than the threshold, compiling the first alternative block into the first alternative block object code, compiling the second alternative block into second alternative block object code, and moving the first alternative block object code and the second alternative block object code to a processor cache; and
    if the second count does not equal to zero, compiling the first alternative block into the first alternative block object code, compiling the second alternative block into the second alternative block object code, and moving the first alternative block object code and the second alternative block object code to the processor cache.

8. The non-transitory computer-readable storage medium of claim 7, further comprising: if the first count is greater than the threshold, the second count equals zero, and an elapsed time since path optimization was enabled is greater than a time threshold, moving the second alternative block to secondary storage and during a subsequent compilation, reading the conditional branch and the first alternative block from memory, and refraining from reading the second alternative block from the secondary storage.

9. The non-transitory computer-readable storage medium of claim 7, further comprising: detecting whether an application that comprises the conditional branch, the first alternative block, and the second alternative block has changed from a previous version to a new version; and if the application has changed, initializing the first count and the second count to zero.

10. The non-transitory computer-readable storage medium of claim 9, further comprising: if the application has not changed, refraining from initializing the first count and the second count to zero.

11. The non-transitory computer-readable storage medium of claim 7, further comprising: if the first count is greater than the threshold and the second count equals zero, moving the first alternative block object code to a processor cache, wherein the processor reads the first alternative block object code from the processor cache and executes the first alternative block object code.

12. The non-transitory computer-readable storage medium of claim 7, further comprising: determining whether a class that comprises the conditional branch, the first alternative block, and the second alternative block is a member of a monitored set; if the class is the member of the monitored set, performing the saving; and if the class is not the member of the monitored set, refraining from performing the saving.

13. A computer system comprising:
a processor; and
memory communicatively connected to the processor, wherein the memory is encoded with instructions, and wherein the instructions when executed on the processor comprise:
detecting a conditional branch that selects between execution of a first alternative block and a second alternative block,
determining whether a class that comprises the conditional branch is a member of a monitored set,
if the class is the member of the monitored set, saving a first count of a number of times the first alternative block was executed and a second count of a number of times the second alternative block was executed,
if the class is the member of the monitored set and if the first count is greater than a threshold and the second count equals zero, compiling the first alternative block into first alternative block object code and refraining from compiling the second alternative block,
if the class is not the member of the monitored set, refraining from saving the first count and the second count, compiling the first alternative block into the first alternative block object code, compiling the second alternative block into second alternative block object code, and moving the first alternative block object code and the second alternative block object code to a processor cache;
if the first count is not greater than the threshold, compiling the first alternative block into the first alternative block object code, compiling the second alternative block into second alternative block object code, and moving the first alternative block object code and the second alternative block object code to a processor cache; and
if the second count does not equal zero, compiling the first alternative block into the first alternative block object code, compiling the second alternative block into the second alternative block object code, and moving the first alternative block object code and the second alternative block object code to the processor cache.

14. The computer system of claim 13, wherein the instructions further comprise:
if the first count is greater than the threshold, the second count equals zero, and an elapsed time since path optimization was enabled is greater than a time threshold, moving the second alternative block to secondary storage and during a subsequent compilation, reading the conditional branch and the first alternative block from memory and refraining from reading the second alternative block from the secondary storage.

15. The computer system of claim 13, wherein the instructions further comprise:
detecting whether an application that comprises the conditional branch, the first alternative block, and the second alternative block has changed from a previous version to a new version; and
if the application has changed, initializing the first count and the second count to zero.

16. The computer system of claim 15, wherein the instructions further comprise:
if the application has not changed, refraining from initializing the first count and the second count to zero.

17. The computer system of claim 13, wherein the instructions further comprise:
if the first count is greater than the threshold and the second count equals zero, moving the first alternative block object code to a processor cache, wherein the processor reads the first alternative block object code from the processor cache and executes the first alternative block object code.

* * * * *